(12) United States Patent
Son et al.

(10) Patent No.: US 10,888,870 B2
(45) Date of Patent: Jan. 12, 2021

(54) GRINDER USING INDUCED ELECTRIC FIELD

(71) Applicant: LG Chem, Ltd., Seoul (KR)

(72) Inventors: Jin Young Son, Daejeon (KR); Hyung Suk Cho, Daejeon (KR); Sang Hoon Choy, Daejeon (KR); Byoung Hoon Ahn, Daejeon (KR); Hyun Sik Chae, Daejeon (KR)

(73) Assignee: LG Chem, Ltd.

( * ) Notice: Subject to any disclaimer, the term of this patent is extended or adjusted under 35 U.S.C. 154(b) by 262 days.

(21) Appl. No.: 15/744,483

(22) PCT Filed: Mar. 17, 2017

(86) PCT No.: PCT/KR2017/002946
§ 371 (c)(1),
(2) Date: Jan. 12, 2018

(87) PCT Pub. No.: WO2017/164591
PCT Pub. Date: Sep. 28, 2017

(65) Prior Publication Data
US 2018/0264478 A1    Sep. 20, 2018

(30) Foreign Application Priority Data
Mar. 23, 2016   (KR) .......................... 10-2016-0034679

(51) Int. Cl.
*B02C 17/16*     (2006.01)
*H01M 4/62*      (2006.01)
(Continued)

(52) U.S. Cl.
CPC ................ *B02C 17/16* (2013.01); *B02C 4/30* (2013.01); *B02C 17/002* (2013.01);
(Continued)

(58) Field of Classification Search
CPC ....... B02C 17/00; B02C 17/002; B02C 17/005; B02C 17/16; B02C 17/163; B02C 4/30;
(Continued)

(56) References Cited

U.S. PATENT DOCUMENTS 3,937,405 A * 2/1976 Stephanoff .............. B01F 5/102
                                                          241/39
4,134,557 A * 1/1979 Lazzari ................... B02C 17/18
                                                          241/170
(Continued)

FOREIGN PATENT DOCUMENTS

CN       2430216 Y    5/2001
CN       1718282 A    1/2006
(Continued)

OTHER PUBLICATIONS

Extended European Search Report for Application No. EP17770561.3 dated Jan. 23, 2019, 7 pages.
(Continued)

*Primary Examiner* — Shelley M Self
*Assistant Examiner* — Teresa A Guthrie
(74) *Attorney, Agent, or Firm* — Lerner, David, Littenberg, Krumholz & Mentlik, LLP

(57) ABSTRACT

The present invention relates to a grinder using induced electric fields. The grinder comprises: a grinding unit on which a plurality of protrusions for cutting are disposed on an outer circumferential surface thereof; a power unit disposed in the grinding unit to generate electric fields and attach the conductive materials to the grinding unit; and a chamber disposed outside the grinding unit and comprising beads that disperse and grind the conductive materials attached to the grinding unit, wherein the conductive materials have directionality by the electric fields of the power unit.

3 Claims, 4 Drawing Sheets

(51) Int. Cl.
   *B02C 19/18* (2006.01)
   *B02C 17/00* (2006.01)
   *B02C 4/30* (2006.01)
   *B03C 1/10* (2006.01)
   *H01M 10/052* (2010.01)

(52) U.S. Cl.
   CPC .......... *B02C 17/005* (2013.01); *B02C 17/163* (2013.01); *B02C 19/18* (2013.01); *B03C 1/10* (2013.01); *H01M 4/624* (2013.01); *H01M 4/625* (2013.01); *H01M 10/052* (2013.01)

(58) Field of Classification Search
   CPC .......... B02C 19/18; B03C 1/10; B03C 1/247; H01M 4/624; H01M 4/625; H01M 10/052
   USPC ........................................................ 241/221
   See application file for complete search history.

(56) References Cited

U.S. PATENT DOCUMENTS

| | | | |
|---|---|---|---|
| 4,632,316 A | | 12/1986 | Watanabe et al. |
| 4,856,717 A | * | 8/1989 | Kamiwano ........... B02C 17/005 241/65 |
| 8,846,248 B2 | * | 9/2014 | Ryu .................... H01M 4/0404 427/532 |
| 2002/0119200 A1 | * | 8/2002 | Haskell .................... A61K 9/14 424/489 |
| 2014/0186522 A1 | | 7/2014 | Woo et al. |
| 2014/0263768 A1 | | 9/2014 | Noge |
| 2015/0375235 A1 | * | 12/2015 | Roitto .................... B02C 17/00 241/15 |
| 2016/0315331 A1 | * | 10/2016 | Yoshiwara ............ H01M 4/926 |

FOREIGN PATENT DOCUMENTS

| | | |
|---|---|---|
| CN | 102166540 A | 8/2011 |
| JP | S58076151 A | 5/1983 |
| JP | S62125839 A | 6/1987 |
| KR | 20120002043 A | 1/2012 |
| KR | 20120033766 A | 4/2012 |
| KR | 20140073936 A | 6/2014 |
| KR | 20140086811 A | 7/2014 |
| KR | 20150085923 A | 7/2015 |
| KR | 20150142735 A | 12/2015 |

OTHER PUBLICATIONS

Search report from Internationa Application No. PCT/KR2017/002946, dated Jun. 16, 2017.
Chinese Search Report for Application No. CN201780002543.9 dated Sep. 2, 2019.
Gao J, He Y, Gong X. Effect of electric field induced alignment and dispersion of functionalized carbon nanotubes on properties of natural rubber. Results in Physics. Jun. 1, 2018;9:493-9.
Amani, A.M. et al, Chapter 5 "Electric Field Induced Alignment of Carbon Nanotubes: Methodology and Outcomes," Carbon Nanoubes—Recent Progress, Published Apr. 26, 2018, edited by Mohammed Muzibur Rahman; ISBN 978-1-78923-053-6, copyright 2018, pp. 71-88.

* cited by examiner

GRINDER USING INDUCED ELECTRIC FIELD

CROSS-REFERENCE TO RELATED APPLICATION

The present application is a national phase entry under 35 U.S.C. § 371 of International Application No. PCT/KR2017/002946 filed Mar. 17, 2017, which claims priority from Korean Patent Application No. 10-2016-0034679, filed on Mar. 23, 2016, all of which are incorporated herein by reference.

TECHNICAL FIELD

The present invention relates to a grinder using induced electric fields, and more particularly, to a grinder using induced electric fields, which is improved in grinding efficiency of CNT and CNF that are highly dispersive conductive materials to improve dispersibility.

BACKGROUND ART

In general, conductive materials serve as moving paths of electrons in lithium secondary batteries. In recent years, carbon nano fibers (CNFs) or carbon nano tubes (CNTs), which have high conductivity and provide direct paths between active materials to realize similar resistance even when a small amount of CNFs or CNTs is used, are getting attention instead of existing carbon black.

In case of the CNFs or the CNTs, it is conveyed in a compression manner because of poor processability and transportability due to a high specific surface area and structural characteristics. Also, a grinding process to facilitate dispersion when applied to secondary batteries has to be performed.

Here, in the related art, a plurality of grinding operations are required to obtain a desired size and a desired dispersed state through the grinding process. To solve this problem, it is necessary to reduce a production time and to ensure uniformity of production quality through improvement of the process.

However, in the grinder according to the related art, grinding characteristics in a predetermined size or less may be deteriorated due to the structural characteristic in which the grinding of the CNFs or the CNTs has directionality. As a result, there is a problem that the grinding extends in process time.

DISCLOSURE OF THE INVENTION

Technical Problem

An object of the present invention is to provide a grinder using induced electric fields so as to solve the above problems, and more particularly, to improve grinding efficiency of CNT and CNF that are highly dispersive conductive materials to improve dispersibility.

Technical Solution

A grinder using induced electric fields, which disperses and grinds conductive materials, according to the present invention comprises: a grinding unit on which a plurality of protrusions for cutting are disposed on an outer circumferential surface thereof; a power unit disposed in the grinding unit to generate electric fields and attach the conductive materials to the grinding unit; and a chamber disposed outside the grinding unit and comprising beads that disperse and grind the conductive materials attached to the grinding unit, wherein the conductive materials have directionality by the electric fields of the power unit.

The grinding unit may have a cylindrical spike mill structure and is rotatable.

The conductive materials may comprise carbon nano fibers (CNFs) or carbon nano tubes (CNTs).

The beads provided in the chamber may comprise zirconia beads.

The chamber may have a function of grounding the grinding unit.

The conductive materials may be aligned in a direction perpendicular to the grinding unit by the electric fields of the power unit and ground through the protrusions when the grinding unit rotates.

A distance between each of the protrusions of the grinding unit and each of the beads of the chamber may be set to adjust a ground length of each of the conductive materials.

Advantageous Effects

As described above, according to the present invention, the CNFs and the CNTs may be fixed in the direction perpendicular to the grinder through the electric fields to improve the grinding efficiency and thus to reduce the number of grinding processes, thereby reducing the process costs and time.

MODE FOR CARRYING OUT THE INVENTION

Figure 1:
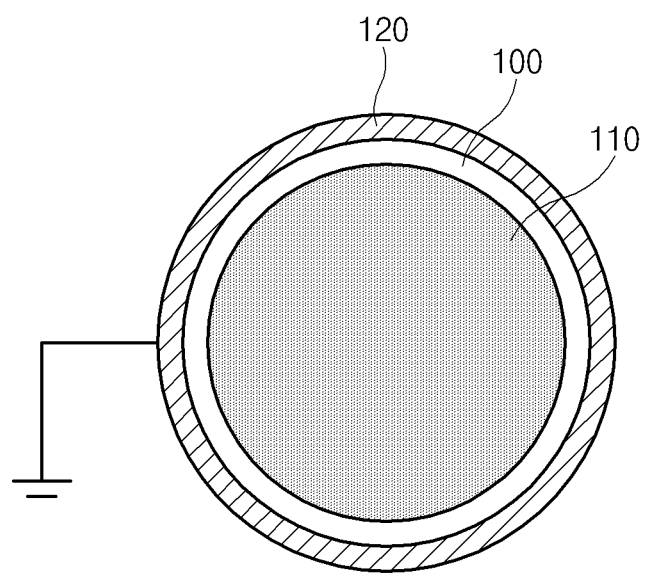
FIG. 1 is a view of a grinder using induced electric fields according to the present invention.

Hereinafter, an exemplary embodiment of the present invention will be described in detail with reference to the accompanying drawings.

As illustrated in FIGS. 1 to 4, a grinder using induced electric fields comprises a grinding unit 100 having protrusions 101, a power unit 110 generating electric fields, a chamber 120 comprising beads 121, and conductive materials having directionality by the electric fields.

Figure 2:
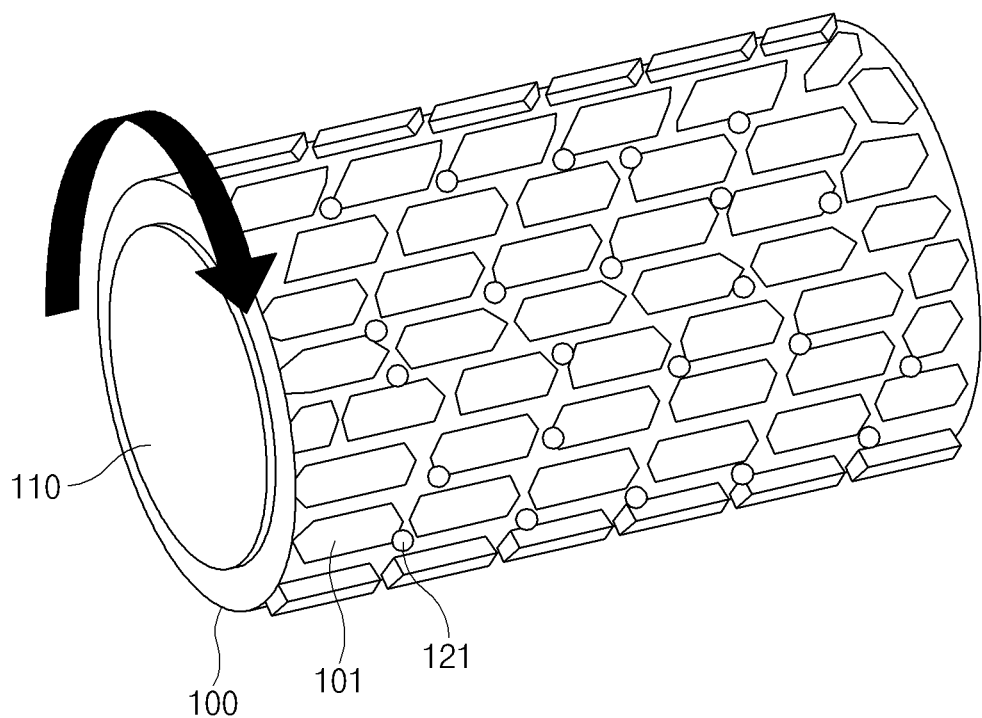
FIG. 2 is a perspective view of the grinder using the induced electric fields according to the present invention.
Figure 3:
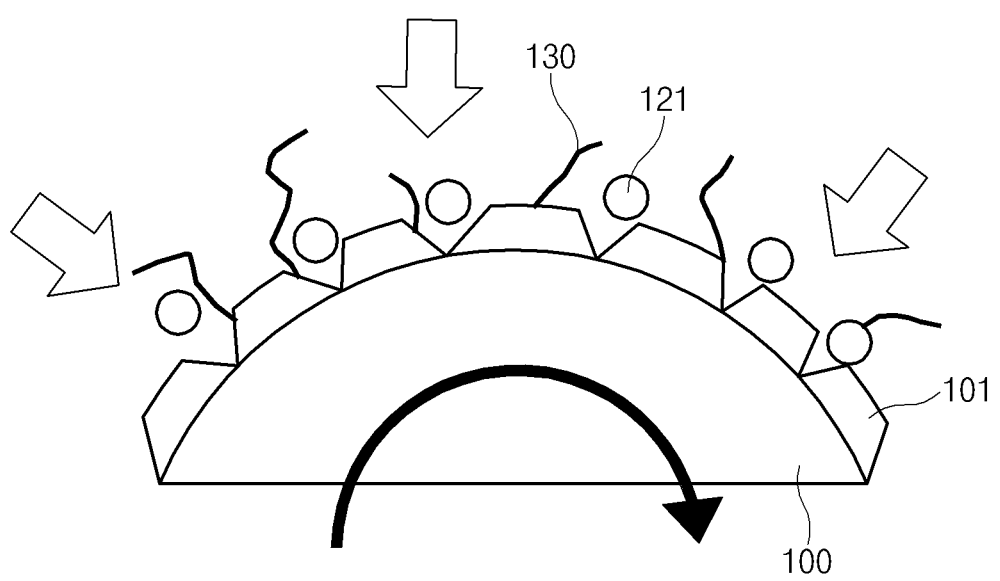
FIGS. 3 and 4 are cross-sectional views illustrating an aligned state of conductive materials in the grinder using the induced electric fields according to the present invention.

As illustrated in FIGS. 2 and 3, the grinding unit 100 may be a grinding device on which a plurality of protrusions 101 for cutting are disposed on an outer circumferential surface thereof.

Here, the grinding unit 100 has a cylindrical spike mill structure and performs the grinding while rotating.

As illustrated in FIGS. 1 and 2, the power unit 110 is disposed in the grinding unit 100 to generate the electric fields when power is applied thereto.

The chamber 120 is disposed outside the grinding unit 100. The beads 121 are disposed in the chamber 120. Thus, when the grinding unit 100 rotates, the conductive materials 130 that will be described below may be physically ground by kinetic energy between the beads 121 and the protrusions 101.

Also, the chamber 120 may have a grounding function so that the grinding unit 100 is grounded when the power is generated by the power unit 110.

Figure 4:
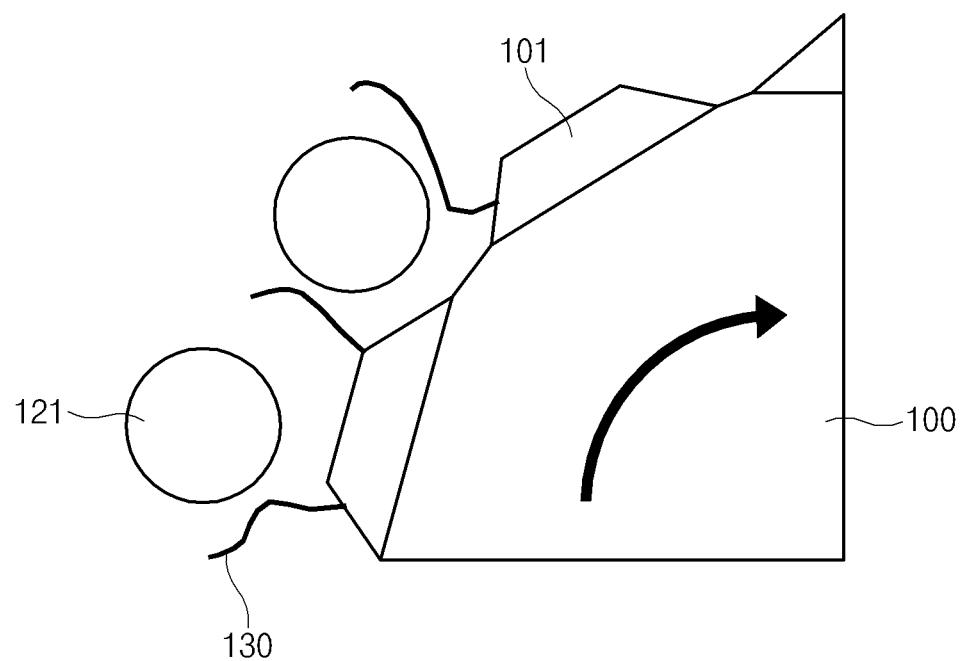

As illustrated in FIGS. 3 and 4, the conductive materials 130 may be disposed between the protrusions 101 of the grinding unit 100 and the beads 121 of the chamber 120 and have directionality by the electric fields of the power unit 110.

Here, the conductive materials 130 may comprise carbon nano fibers (CNFs) or carbon nano tubes (CNTs).

Also, the beads disposed on the chamber 120 may comprise zirconia beads, which are minerals having high refractive index, corrosion resistance, and melting point so that the beads 121 are not worn due to their high strength when the conductive materials 130 are ground.

As described above, the conductive materials 130 are aligned in a direction perpendicular to the grinding unit 100 when induced electric fields are generated by the electric fields of the power unit 110. Thus, when the grinding unit 100 rotates, the conductive materials 130 are ground through the protrusions 101 in the state in which the conductive materials 130 are vertically disposed between the protrusions 101 of the grinding unit 100 and the beads 121 of the chamber 120.

Here, a distance between each of the protrusions 101 of the grinding unit 100 and each of the beads 121 of the chamber 120 may be set to adjust a ground length of each of the conductive materials 130.

That is, the grinder according to the present invention comprises the grinding unit 100 on which the protrusions 101 for the cutting are disposed on the outer circumferential surface thereof, the power unit 110 disposed in the grinding unit 100 to generate the electric fields, the chamber 120 disposed outside the grinding unit 100 and comprising the beads 121 therein, and the conductive materials 130 disposed between the protrusions 101 of the grinding unit 100 and the beads 121 of the chamber 120 and having the directionality by the electric fields of the power unit 110. Therefore, the CNFs and the CNTs may be fixed in the direction perpendicular to the grinder through the induced electric fields to improve the grinding efficiency of the conductive materials 130 and thus to reduce the number of grinding processes, thereby reducing the process costs and time.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method of dispersing and grinding conductive materials using induced electric fields, the conductive materials comprising carbon nano fibers (CNFs) or carbon nano tubes (CNTs), the method comprising:

rotating a grinding unit of a grinder, the grinding unit having a plurality of protrusions disposed on an outer circumferential surface thereof, the protrusions having a cylindrical spike mill structure in which the grinding unit has a cylindrical shape and the protrusions extend from the outer circumferential surface thereof;

generating the induced electric fields from a power unit disposed in the grinding unit, the induced electric fields attaching the conductive materials to the grinding unit, the conductive materials being given directionality by the induced electric fields, the conductive materials being aligned by the induced electric fields in a direction perpendicular to the grinding unit; and dispersing and grinding the conductive materials attached to the grinding unit using beads contained within a chamber disposed outside the grinding unit, the conductive materials being ground by being disposed between the protrusions and the beads when the grinding unit rotates.

2. The method of claim 1, wherein the beads contained within the chamber comprise zirconia beads.

3. The grinder method of claim 1, wherein the grinding unit is electrically grounded.

* * * * *